US012715750B2

(12) United States Patent
Kim

(10) Patent No.: US 12,715,750 B2
(45) Date of Patent: Aug. 25, 2026

(54) COLD WATER TANK

(71) Applicant: COWAY CO., LTD., Gongju-si (KR)

(72) Inventor: Jae Man Kim, Gongju-si (KR)

(73) Assignee: COWAY CO., LTD., Gongju-si (KR)

( * ) Notice: Subject to any disclaimer, the term of this patent is extended or adjusted under 35 U.S.C. 154(b) by 198 days.

(21) Appl. No.: 18/703,579

(22) PCT Filed: Oct. 13, 2022

(86) PCT No.: PCT/KR2022/015503
§ 371 (c)(1),
(2) Date: Apr. 22, 2024

(87) PCT Pub. No.: WO2023/075226
PCT Pub. Date: May 4, 2023

(65) Prior Publication Data

US 2025/0002322 A1 Jan. 2, 2025

(30) Foreign Application Priority Data

Oct. 29, 2021 (KR) ........................ 10-2021-0146992

(51) Int. Cl.
*B67D 1/08* (2006.01)
*B67D 1/12* (2006.01)

(52) U.S. Cl.
CPC .... *B67D 1/0859* (2013.01); *B67D 2001/1263* (2013.01); *B67D 2210/00049* (2013.01)

(58) Field of Classification Search
USPC ........................................................ 222/146.6
See application file for complete search history.

(56) References Cited

U.S. PATENT DOCUMENTS 2,718,127 A 9/1955 Minor
6,394,312 B1 * 5/2002 Endou .................. B67D 1/0032 222/63

(Continued)

FOREIGN PATENT DOCUMENTS

EP 4406912 A1 * 7/2024 ........... F25D 31/003
JP 4959137 U 5/1974

(Continued)

OTHER PUBLICATIONS

Extended European Search Report issued Sep. 2, 2025, in corresponding European Patent Application No. 22887429.3, 9 pages.

(Continued)

*Primary Examiner* — Paul R Durand
*Assistant Examiner* — Michael J. Melaragno
(74) *Attorney, Agent, or Firm* — Oblon, McClelland, Maier & Neustadt, L.L.P.

(57) ABSTRACT

The present invention provides a cold water tank. In the cold water tank, an accommodation space for accommodating a fluid is partitioned by means of partition walls alternately disposed in the transverse direction such that the fluid flows straight along the partition walls, and an evaporator having m evaporation pipes forming an offset and m−1 connection pipes connecting the m evaporation pipes is disposed in the accommodation space opposite to the partition walls so as to be heat-exchanged with the fluid. Therefore, the cold water tank has increased contact surface area heat-exchanged with the fluid and prevents excessive ice formation, and thus provides an enhanced cold water dispensing performance.

11 Claims, 6 Drawing Sheets

(56) References Cited

U.S. PATENT DOCUMENTS

| | | | | |
|---|---|---|---|---|
| 12,264,060 | B2 * | 4/2025 | Heo | B67D 1/0869 |
| 2008/0256972 | A1 * | 10/2008 | Knoll | B67D 1/0864 62/139 |
| 2010/0163479 | A1 * | 7/2010 | Kim | E03B 11/06 210/348 |
| 2014/0223942 | A1 | 8/2014 | Lee et al. | |
| 2017/0177010 | A1 * | 6/2017 | Oh | B01D 21/0012 |
| 2020/0031654 | A1 * | 1/2020 | Wing | F25D 31/003 |
| 2020/0361758 | A1 * | 11/2020 | Fantappié | B67D 1/10 |
| 2025/0002322 | A1 * | 1/2025 | Kim | B67D 1/0859 |
| 2025/0164162 | A1 * | 5/2025 | Kim | F25B 41/40 |
| 2025/0189186 | A1 * | 6/2025 | Watt | B67D 1/0857 |
| 2025/0296724 | A1 * | 9/2025 | Joo | B65D 1/42 |

FOREIGN PATENT DOCUMENTS

| | | | | |
|---|---|---|---|---|
| JP | 2001-227854 | A | 8/2001 | |
| JP | 2004-168331 | A | 6/2004 | |
| KR | 10-2015-0124222 | A | 11/2015 | |
| KR | 10-1658496 | B1 | 9/2016 | |
| KR | 10-2019-0078916 | A | 7/2019 | |
| KR | 10-2053784 | B1 | 12/2019 | |
| KR | 10-2020-0008263 | A | 1/2020 | |
| KR | 10-2020-0078898 | A | 7/2020 | |
| WO | WO-2013048149 | A1 * | 4/2013 | F25D 31/003 |
| WO | WO 2016/094107 | A1 | 6/2016 | |

OTHER PUBLICATIONS

International Search Report issued on Feb. 6, 2023 in PCT/KR2022/015503 filed on Oct. 13, 2022, 2 pages.

Japanese Notice of Allowance issued Jun. 17, 2025 in Japanese Patent Application No. 2024-525075, 3 pgs.

* cited by examiner

COLD WATER TANK

CROSS-REFERENCE TO RELATED APPLICATIONS

This application claims the benefit of priority from prior of Korean Patent Application No. 10-2021-0146992 filed Oct. 29, 2021, the entire contents of which is incorporated herein by reference in its entirety.

TECHNICAL FIELD

The present invention relates to a cold water tank, and more particularly, to a cold water tank that improves the performance of extracting cold water while reducing manufacturing costs by making the cold water tank not large in order to extract a lot of cold water, and improves user satisfaction by extracting cold water in a direct water manner.

BACKGROUND

In general, a cold water tank is a device that cools water supplied from a faucet, a water bottle, or purified water storage device and provides it to the user. These cold water tanks are mainly installed for the generation of low-temperature drinking water for water purifiers, carbonated water purifiers, and cold and hot water purifiers, but can be used in various fields that require the generation of cold water.

Coway Co., Ltd.'s Korean Patent Laid-Open Publication No. 10-2020-0008263 discloses a conventional cold water tank. Such a cold water tank is provided with a tank body and a cooling unit that cools the water stored in the tank body to become cold water. In this case, ice is generated on the outer surface of the cooling unit, preventing sufficient chilliness from being delivered to the water stored inside the tank body, resulting in poor cold water extraction efficiency.

The cooling device for a water purifier disclosed in Haewon Electric Industrial Controls Co., Ltd.'s Korean Patent Registration No. 10-1658496 includes a cold water tank and a cooling pipe that cools the water stored in the cold water tank by contacting the outer circumferential surface of the cold water tank. In such a cooling device, as the cooling pipe is arranged on the outer circumferential surface of the cold water tank, the chilliness of the cooling pipe is not transmitted only to the cold water tank but is discharged to the outside, so there is a problem of degrading cooling efficiency.

The cold water tank for a water purifier disclosed in Won Bong Co., Ltd.'s Korean Patent Registration No. 10-2053784 is equipped with a tank body, a cooling coil surrounding the outer circumferential surface of the tank body, and a heat insulating material surrounding the cooling coil. In the cold water tank for a water purifier, the cooling coil is not exposed to the outside by the heat insulating material, but the cooling coil does not directly contact water stored in the tank body, thereby degrading cooling efficiency. In addition, there is a problem that the tank body is formed in a cylindrical shape, limiting the design space of the water purifier, and increasing the manufacturing cost by increasing the size of the entire water purifier to design the tank body in a large capacity.

SUMMARY OF THE INVENTION

Technical Problem

To solve the above problems, a cold water tank according to an exemplary embodiment of the present invention is to minimize the design space of the water purifier while extracting a large amount of cold water by dividing the accommodation space for accommodating the fluid into partition walls so that the fluid moves directly along the partition walls and the evaporator is placed in the accommodation space to exchange heat with the fluid.

The cold water tank according to an exemplary embodiment of the present invention is to improve the performance of cold water extraction by increasing the contact area heat-exchanged with fluid in the accommodation space by including m evaporation pipes and m−1 connection pipes connecting m evaporation pipes in which the evaporator forms an offset.

The cold water tank according to an exemplary embodiment of the present invention is to prevent excessive proximity of the connection pipes and the partition walls to each other by alternately arranging the partition walls in the transverse direction in the accommodation space, thereby preventing the performance of cold water extraction from deteriorating due to excessive ice generation on the outer circumferential surface of the connection pipe.

The cold water tank for a direct water purifier according to an exemplary embodiment of the present invention is to prevent the body part from being rapidly expanded and damaged by fluid as the discharge of internal air is controlled.

The cold water tank for a direct water purifier according to an exemplary embodiment of the present invention is to improve power consumption efficiency while providing cold water corresponding to a temperature range desired by a user by precisely measuring the temperature of the refrigerant.

Technical Solution

To achieve the above objects, a cold water tank according to an exemplary embodiment of the present invention includes a body part having an accommodation space for accommodating a fluid; a partition wall part composed of n partition walls that laterally divide the accommodation space of the body part into n+1 zones (n is an integer equal to or greater than 1); an evaporator disposed in the accommodation space of the body part to cool a fluid moving through the n+1 zones, wherein the evaporator includes m evaporation pipes (m is an integer of 2 or more) that are arranged to face the partition walls, wherein at least some of the evaporation pipes are arranged in a first direction; and m−1 connection pipes connecting a $k^{th}$ evaporation pipe and a $[k+1]^{th}$ evaporation pipe so that the $[k+1]^{th}$ evaporation pipe forms a first offset with the $k^{th}$ evaporation pipe in a second direction perpendicular to the first direction and forms a second offset with the $k^{th}$ evaporation pipe in the longitudinal direction, and connecting the $[k+1]^{th}$ evaporation pipe and a $[k+2]^{th}$ evaporation pipe so that the $[k+2]^{th}$ evaporation pipe forms a first offset with the $[k+1]^{th}$ evaporation pipe in a third direction, which is the reverse direction of the second direction, and forms a second offset with the $[k+1]^{th}$ evaporation pipe in the longitudinal direction (k is an odd number equal to or greater than 1 and less than m−1), wherein the partition wall includes an opening through which the connection pipe passes.

In the cold water tank according to an exemplary embodiment of the present invention, at least one evaporation pipe may be disposed in each of the zones except for the uppermost zone and the lowermost zone among the zones of the accommodation space.

In the cold water tank according to an exemplary embodiment of the present invention, the m−1 connection pipes may include a plurality of first connection pipes connecting the $k^{th}$ evaporation pipe and the $[k+1]^{th}$ evaporation pipe; and a plurality of second connection pipes connecting the $[k+1]^{th}$ evaporation pipe and the $[k+2]^{th}$ evaporation pipe.

In the cold water tank according to an exemplary embodiment of the present invention, the plurality of first connection pipes may be disposed in parallel and at equal intervals to each other on a first plane of the accommodation space.

In the cold water tank according to an exemplary embodiment of the present invention, the plurality of second connection pipes may be disposed in parallel and at equal intervals to each other on a second plane parallel to the first plane in the accommodation space.

In the cold water tank according to an exemplary embodiment of the present invention, each of the n partition walls may be formed at a height through which any one of the plurality of first connection pipes and the plurality of second connection pipes passes.

In the cold water tank according to an exemplary embodiment of the present invention, the n partition walls may include a first partition wall part through which any one of the plurality of first connection pipes passes, and a second partition wall part through which any one of the plurality of second connection pipes passes, and the first partition wall part and the second partition wall part may be alternately arranged in the transverse direction in the accommodation space.

In the cold water tank according to an exemplary embodiment of the present invention, a third plane including any one of the plurality of first connection pipes and a plane including the partition wall part may be formed to have an angle greater than 0° and less than 90° from each other.

In the cold water tank according to an exemplary embodiment of the present invention, a fourth plane including any one of the plurality of second connection pipes and a plane including the partition wall part may be formed to have an angle greater than 0° and less than 90° from each other.

In the cold water tank according to an exemplary embodiment of the present invention, the opening may be located at a regular interval from the inner surface of the body part.

The cold water tank according to an exemplary embodiment of the present invention may further include an air discharge part formed on an upper side of the body part and controlling whether the air inside the body part is discharged to the outside of the body part according to a water level of a fluid accommodated in the body part.

The cold water tank according to an exemplary embodiment of the present invention may further include a water level sensor disposed on an upper side of the body part and sensing the level of the fluid accommodated in the body part, and the water level sensor may control the air discharge part according to the level of the fluid accommodated in the body part.

The cold water tank according to an exemplary embodiment of the present invention may further include a temperature sensor that senses the internal temperature of the body part.

Advantageous Effects

The cold water tank according to an exemplary embodiment of the present invention can minimize the design space of the water purifier while extracting a large amount of cold water by dividing the accommodation space for accommodating the fluid into partition walls so that the fluid moves directly along the partition walls and the evaporator is placed in the accommodation space to exchange heat with the fluid.

The cold water tank according to an exemplary embodiment of the present invention can improve the performance of cold water extraction by increasing the contact area heat-exchanged with fluid in the accommodation space by including m evaporation pipes and m−1 connection pipes connecting m evaporation pipes in which the evaporator forms an offset.

The cold water tank according to an exemplary embodiment of the present invention can prevent excessive proximity of the connection pipes and the partition walls to each other by alternately arranging the partition walls in the transverse direction in the accommodation space, thereby preventing the performance of cold water extraction from deteriorating due to excessive ice generation on the outer circumferential surface of the connection pipe.

The cold water tank for a direct water purifier according to an exemplary embodiment of the present invention can prevent the body part from being rapidly expanded and damaged by fluid as the discharge of internal air is controlled.

The cold water tank for a direct water purifier according to an exemplary embodiment of the present invention can improve power consumption efficiency while providing cold water corresponding to a temperature range desired by a user by precisely measuring the temperature of the refrigerant.

Figure 1:
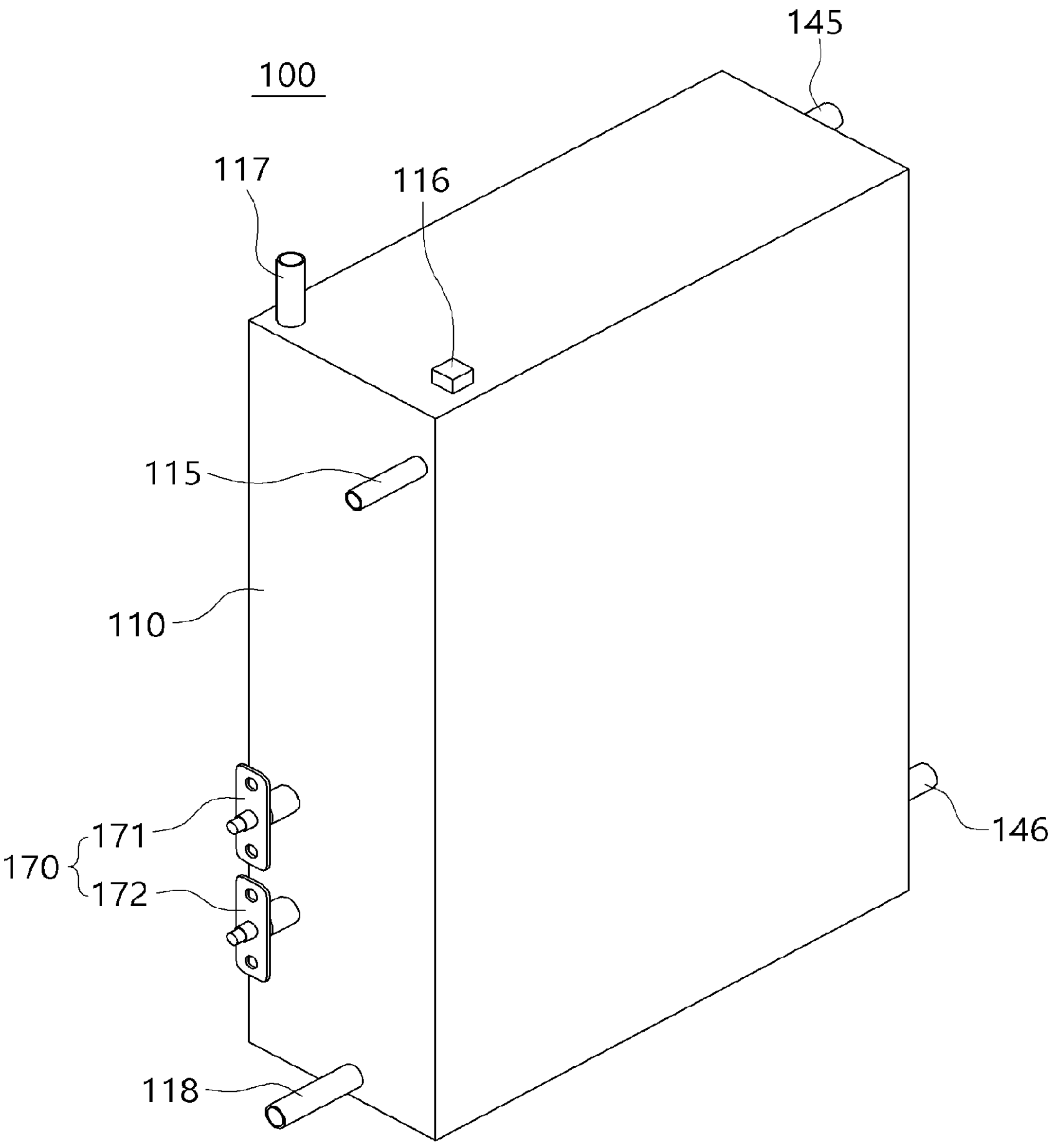
FIG. 1 is a perspective view illustrating the appearance of a cold water tank according to an exemplary embodiment of the present invention.

100: cold water tank
110: body part
110*a*: uppermost zone
110*b*, 110*c*, 110*d*, 110*e*, 110*f*, 110*g*: n zones
110*h*: lowermost zone
119: accommodation space
120: partition wall part
121, 122, 123, 124, 125: n partition walls
121*a*, 122*a*, 123*a*, 124*a*, 125*a*: opening
130: evaporator
131, 132, 133, 134, 135, 136, 137, 138, 139, 140, 141, 142: m evaporation pipes
151, 152, 153, 154, 155, 156, 157, 158, 159, 160, 161: m−1 connection pipes

DETAILED DESCRIPTION OF THE EMBODIMENTS

Terms and words used in the present specification and claims should not be construed as limited to their usual or dictionary definition. They should be interpreted as meaning and concepts consistent with the technical idea of the present invention, based on the principle that inventors may appropriately define the terms and concepts to describe their invention in the best way.

Accordingly, the embodiments described in the present specification and the configurations shown in the drawings correspond to preferred embodiments of the present invention, and do not represent all the technical idea of the present invention, so the configurations may have various examples of equivalent and modification that can replace them at the time of filing the present invention.

It should be understood that the terms "comprise" or "have" or the like when used in this specification, are intended to describe the presence of stated features, integers, steps, operations, elements, components and/or a combination thereof but not preclude the possibility of the presence or addition of one or more other features, integers, steps, operations, elements, components, or a combination thereof.

The presence of an element in/on "front", "rear", "upper or above or top" or "lower or below or bottom" of another element includes not only being disposed in/on "front", "rear", "upper or above or top" or "lower or below or bottom" directly in contact with other elements, but also cases in which another element being disposed in the middle, unless otherwise specified. In addition, unless otherwise specified, that an element is "connected" to another element includes not only direct connection to each other but also indirect connection to each other.

Hereinafter, a cold water tank according to an exemplary embodiment of the present invention will be described with reference to the accompanying drawings.

Figure 2:
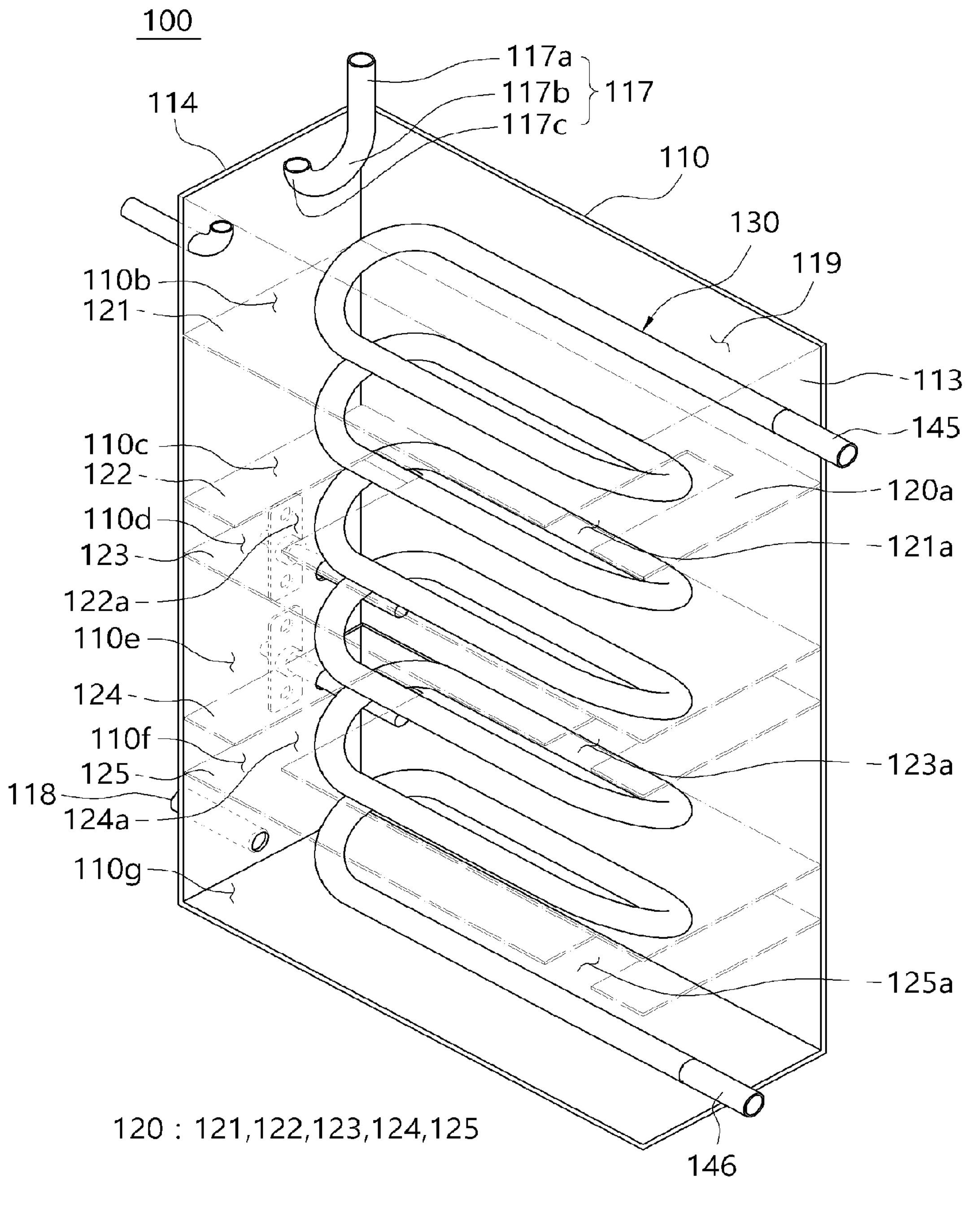
FIG. 2 is a perspective view illustrating the interior of a cold water tank according to an exemplary embodiment of the present invention.
Figure 3:
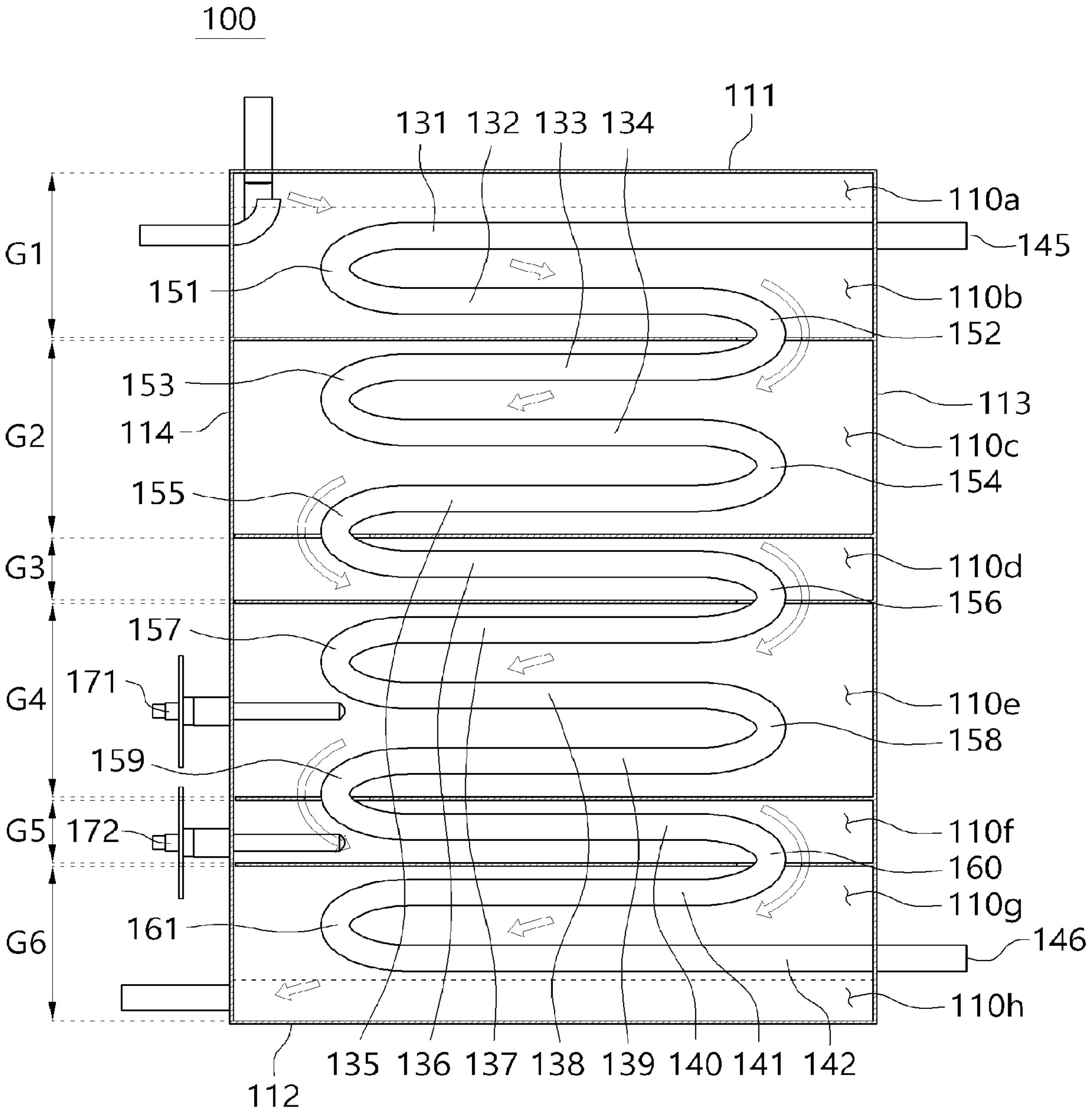
FIG. 3 is a front view illustrating the interior of a cold water tank according to an exemplary embodiment of the present invention.
Figure 4:
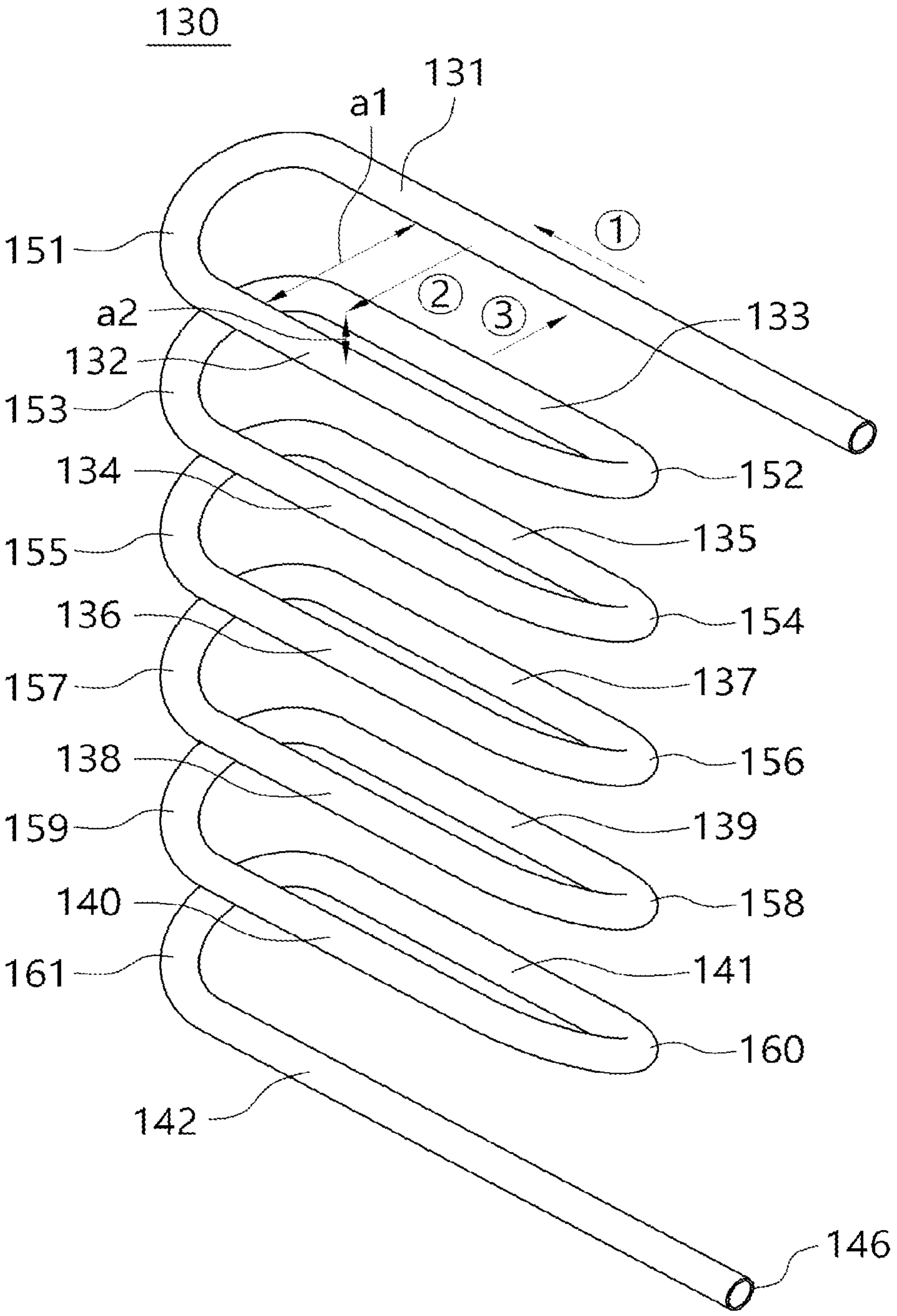
FIG. 4 is a perspective view illustrating an evaporator of a cold water tank according to an exemplary embodiment of the present invention.
Figure 5:
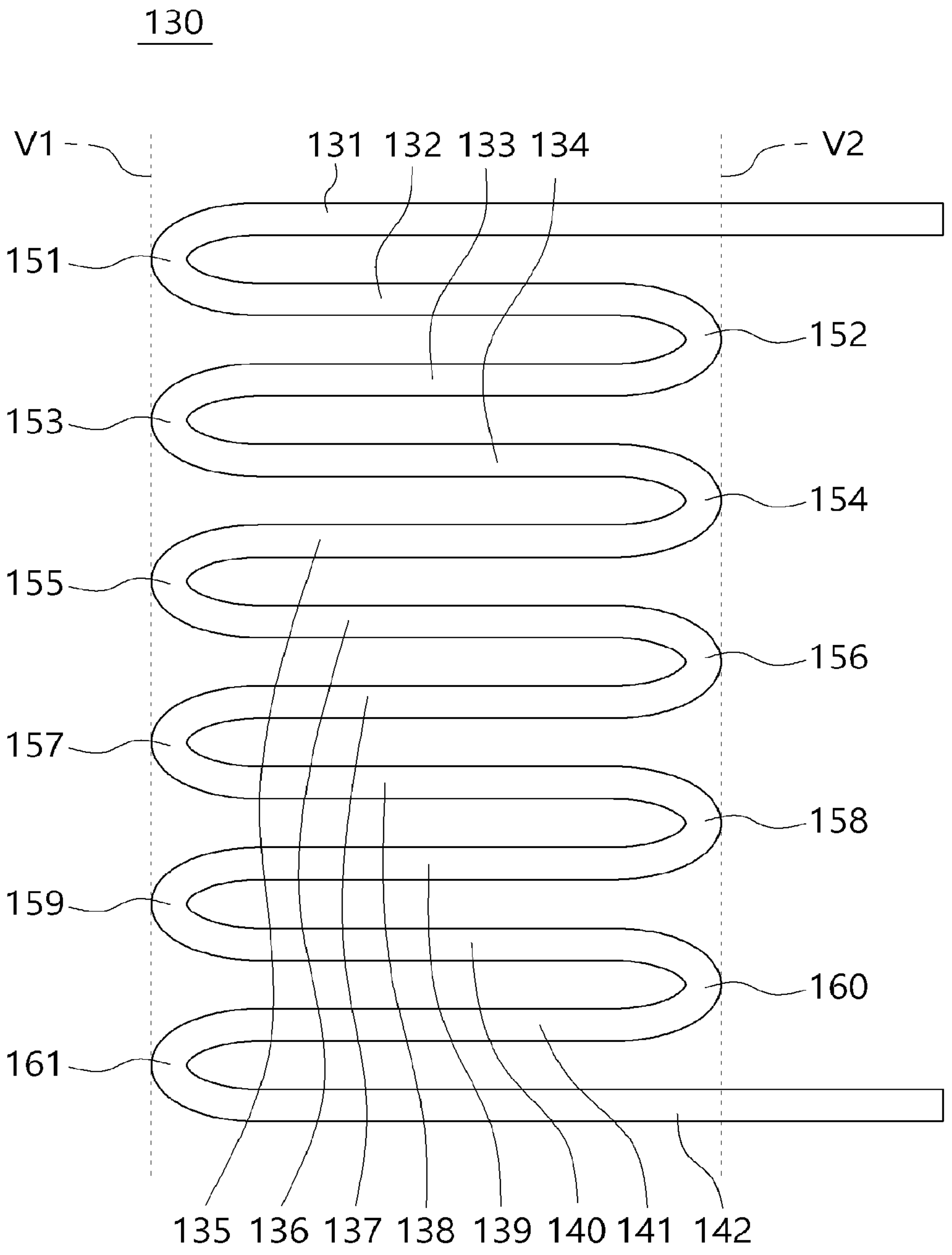
FIG. 5 is a front view illustrating an evaporator of a cold water tank according to an exemplary embodiment of the present invention.
Figure 6:
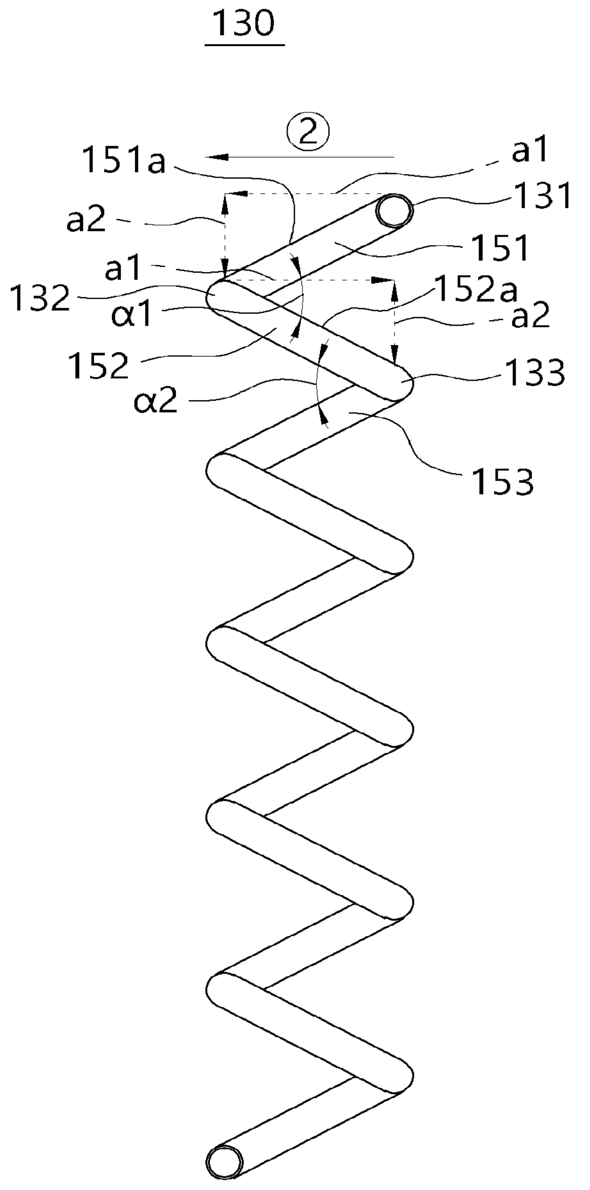
FIG. 6 is a side view illustrating an evaporator of a cold water tank according to an exemplary embodiment of the present invention.

FIG. 1 is a perspective view illustrating the appearance of a cold water tank according to an exemplary embodiment of the present invention, FIG. 2 is a perspective view illustrating the interior of a cold water tank according to an exemplary embodiment of the present invention, FIG. 3 is a front view illustrating the interior of a cold water tank according to an exemplary embodiment of the present invention, FIG. 4 is a perspective view illustrating an evaporator of a cold water tank according to an exemplary embodiment of the present invention, FIG. 5 is a front view illustrating an evaporator of a cold water tank according to an exemplary embodiment of the present invention, and FIG. 6 is a side view illustrating an evaporator of a cold water tank according to an exemplary embodiment of the present invention.

Referring to FIGS. 1 to 6, the cold water tank 100 according to an exemplary embodiment of the present invention includes a body part 110 having an accommodation space 119 for accommodating a fluid, a partition wall part 120 partitioning the accommodation space 119 of the body part 110, and an evaporator 130 disposed in the accommodation space 119 of the body part 110.

The body part 110 is formed in a cube shape and is disposed inside a water purifier (not shown). However, the body part 110 is not limited to being disposed inside the water purifier, and may be disposed outside the water purifier. In addition, the partition wall part 120 and the evaporator 130 are provided in the accommodation space 119 of the body part 110. In addition, the body part 110 is formed in the form of a cube including an upper surface 111, a lower surface 112 formed parallel to the upper surface 111, a first side surface 113 connected between the upper surface 111 and the lower surface 112, and a second side surface 114 formed parallel to the first side surface 113. In this way, since the body part 110 is formed in the form of a cube, it accommodates a large amount of the fluid in the accommodation space 119 compared to the cylindrical shape in the same space, which has an advantage of extracting a large amount of cold water without increasing the size of the water purifier itself. In addition, according to various embodiments of the present invention, the body part 110 is not limited to being in the form of a cube, but may be in various forms that can be installed inside a water purifier according to the installation space inside the water purifier. In addition, the material of the body part 110 is stainless steel. However, the material of the body part 110 is not limited to stainless steel, and may be various materials such as metal or plastic that are strong in corrosion resistance and have rigidity. In addition, an inlet pipe 117 through which the fluid flows in from the outside of the body part 110 is formed on the upper surface 111. In this case, the inlet pipe 117 includes a first inlet member 117*a* penetrating the upper surface 111, a second inlet member 117*b* extending from the first inlet member 117*a*, and a third inlet member 117*c* extending from the second inlet member 117*b* so that the fluid moves to the accommodation space 119. In addition, the second inlet member 117*b* is formed in a U-shape, and the fluid does not fall directly in the direction of gravity, but is discharged toward the upper surface 111, thereby preventing the fluid's speed from increasing excessively. In addition, a discharge pipe 118 is formed in the lower portion of the second side surface 114 to discharge the fluid in the accommodation space 119 to the outside. Accordingly, the fluid flowing in through the inlet pipe 117 moves in the accommodation space 119 and is then discharged into the discharge pipe 118.

The partition wall part 120 is composed of n partition walls that laterally divide the accommodation space 119 of the body part 110 into n+1 zones (n is an integer equal to or greater than 1). For example, n may be 5, the n partition walls are 5 partition walls 121, 122, 123, 124, 125, and the n+1 zones are 6 zones 110*b*, 110*c*, 110*d*, 110*e*, 110*f*, 110*g*. However, n is not limited to 5, and n may be 1 to 4 or 6 or more. In addition, the n partition walls 121, 122, 123, 124, 125 include a first partition wall 121, a second partition wall 122, a third partition wall 123, a fourth partition wall 124, and a fifth partition wall 125, which are arranged parallel to each other along the transverse direction. In addition, openings 121*a*, 122*a*, 123*a*, 124*a*, 125*a* through which the fluid moves downward are formed in the n partition walls 121, 122, 123, 124, 125. In addition, the openings 121*a*, 122*a*, 123*a*, 124*a*, 125*a* are formed in a slit shape. However, the openings 121*a*, 122*a*, 123*a*, 124*a*, 125*a* are not limited to being formed in a slit shape, and may have various shapes through which the fluid moves. In this case, the n partition walls 121, 122, 123, 124, 125 are spaced apart from each other at different gaps. That is, the first partition wall 121 is spaced apart from the upper surface 111 of the body part 110 at a first gap G1. In addition, the second partition wall 122 is spaced apart from the first partition wall 121 at a second gap G2. In this case, the second gap G2 is longer than the first gap G1. In addition, the third partition wall 123 is spaced apart from the second partition wall 122 at a third gap G3. In this case, the third gap G3 is smaller than the first gap G1. In addition, the fourth partition wall 124 is spaced apart from the third partition wall 123 at a fourth gap G4. In this case, the fourth gap G4 is equal to the second gap G2. In addition, the fifth partition wall 125 is spaced apart from the fourth partition wall 124 at a fifth gap G5. In this case, the fifth gap G5 is equal to the third gap G3. In addition, according to various embodiments of the present invention, the n partition walls 121, 122, 123, 124, 125 are not limited to being spaced apart at different gaps, but may be spaced apart at equal gaps. In addition, the material of the partition wall part 120 is stainless steel, just like the material of the body part 110. However, the material of the partition wall part 120 is not limited to stainless steel, and may be various materials such as metal or plastic that are strong in corrosion resistance and have rigidity. In addition, the n+1 zones 110*b*, 110*c*, 110*d*, 110*e*, 110*f*, 110*g* include a first zone 110*b*, a second zone 110*c*, a third zone 110*d*, a fourth zone 110*e*, a fifth zone 110*f*, and a sixth zone 110*g* partitioned by the n partition walls 121, 122, 123, 124, 125. The first zone 110*b* is formed between the upper surface 111 of the body part 110 and the first partition wall 121. In addition, a first opening 121*a* for the fluid moving through the first zone 110*b* to move downward is formed in the first partition wall 121. The second zone 110*c* is formed between the first partition wall 121 and the second partition wall 122. In addition, a second opening 122*a* for the fluid moving through the second zone 110*c* to move downward is formed in the second partition wall 122. The third zone 110*d* is formed between the second partition wall 122 and the third partition wall 123. In addition, a third opening 123*a* for the fluid moving through the third zone 110*d* to move downward is formed in the third partition wall 123. The fourth zone 110*e* is formed between the third partition wall 123 and the fourth partition wall 124. In this case, the size of the fourth zone 110*e* is the same as the size of the second zone 110*c*. In addition, a fourth opening 124*a* for the fluid moving through the fourth zone 110*e* to move downward is formed in the fourth partition wall 124. The fifth zone 110*f* is formed between the fourth partition wall 124 and the fifth partition wall 125. In this case, the size of the fifth zone 110*f* is the same as the size of the third zone 110*d*. In addition, a fifth opening 125*a* for the fluid moving through the fifth zone 110*f* to move downward is formed in the fifth partition wall 125. The sixth zone 110*g* is formed between the fifth partition wall 125 and the sixth partition wall 126.

The evaporator 130 is disposed in the accommodation space 119 of the body part 110 to cool the fluid moving through the n+1 zones 110*b*, 110*c*, 110*d*, 110*e*, 110*f*, 110*g*. In addition, a refrigerant heat-exchanged with the fluid is moved to the evaporator 130. In this case, a refrigerant supply pipe 145 through which the refrigerant is supplied from the outside is provided on one side of the evaporator 130. The refrigerant supply pipe 145 penetrates the upper portion of the first side surface 113 of the body part 110. In addition, a refrigerant discharge pipe 146 through which the refrigerant is discharged to the outside is provided on the other side of the evaporator 130. The refrigerant discharge pipe 146 penetrates the lower portion of the first side surface 113 of the body part 110. In addition, the evaporator 130 includes m evaporation pipes (m is an integer of 2 or more) that are arranged to face the partition walls 121, 122, 123, 124, 125, wherein at least some of the evaporation pipes are arranged in the first direction ((1), see FIG. 4), and m−1 connection pipes connecting m evaporation pipes. For example, m is 12, the m evaporation pipes are 12 evaporation pipes 131, 132, 133, 134, 135, 136, 137, 138, 139, 140, 141, 142, and the m−1 connection pipes are 11 connection pipes 151, 152, 153, 154, 155, 156, 157, 158, 159, 160, 161. For example, the 12 evaporation pipes 131, 132, 133, 134, 135, 136, 137, 138, 139, 140, 141, 142 are composed of first to $12^{th}$ evaporation pipes 131, 132, 133, 134, 135, 136, 137, 138, 139, 140, 141, 142. However, m is not limited to 12, and m may be 2 to 11 or 13 or more.

In addition, the m−1 connection pipes connect the $k^{th}$ evaporation pipe (k is an odd number of 1 or more and m−1 or less) and the $[k+1]^{th}$ evaporation pipe, and connect the $[k+1]^{th}$ evaporation pipe and the $[k+2]^{th}$ evaporation pipe. The m−1 connection pipes have a U-shape. However, the m−1 connection pipes are not limited to being formed in a U-shape, and may have various shapes connecting the m evaporation pipes to each other. In this case, the $[k+1]^{th}$ evaporation pipe forms a first offset with the $k^{th}$ evaporation pipe in a second direction ((2), see FIG. 4) perpendicular to the first direction ((1), see FIG. 4), and forms a second offset with the $k^{th}$ evaporation pipe in the longitudinal direction. In addition, the $[k+2]^{th}$ evaporation pipe forms the first offset with the $[k+1]^{th}$ evaporation pipe in a third direction ((3), see FIG. 4), which is the reverse direction of the second direction ((2)), and forms the second offset with the $[k+1]^{th}$ evaporation pipe in the longitudinal direction. For example, if m is 2 and k is 1, the second evaporation pipe 132 forms the first offset (a1, see FIG. 4) with the first evaporation pipe 131 in the second direction ((2)), and forms the second offset (a2, see FIG. 4) with the first evaporation pipe 131 in the longitudinal direction. In addition, the third evaporation pipe 133 forms the first offset (a1) with the second evaporation pipe 132 in the third direction ((3)), and forms the second offset (a2) with the second evaporation pipe 132 in the longitudinal direction. In this case, the m−1 connection pipes include a plurality of first connection pipes 151, 153, 155, 157, 159, 161 connecting the $k^{th}$ evaporation pipe and the $[k+2]^{th}$ evaporation pipe, and a plurality of second connection pipes 152, 154, 156, 158, 160 connecting the $[k+1]^{th}$ evaporation pipe and the $[k+1]^{th}$ evaporation pipe. For example, the plurality of first connection pipes 151, 153, 155, 157, 159, 161 include a first connection pipe 151 connecting the first evaporation pipe 131 and the second evaporation pipe 132, a third connection pipe 153 connecting the third evaporation pipe 133 and the fourth evaporation pipe 134, a fifth connection pipe 155 connecting the fifth evaporation pipe 135 and the sixth evaporation pipe 136, a seventh connection pipe 157 connecting the seventh evaporation pipe 137 and the eighth evaporation pipe 138, a ninth connection pipe 159 connecting the ninth evaporation pipe 139 and the tenth evaporation pipe 140, and an 11th connection pipe 161 connecting the 11th evaporation pipe 141 and the 12th evaporation pipe 142. In addition, the plurality of second connection pipes 152, 154, 156, 158, 160 include a second connection pipe 152 connecting the second evaporation pipe 132 and the third evaporation pipe 133, a fourth connection pipe 154 connecting the fourth evaporation pipe 134 and the fifth evaporation pipe 135, a sixth connection pipe 156 connecting the sixth evaporation pipe 136 and the seventh evaporation pipe 137, an eighth connection pipe 158 connecting the eighth evaporation pipe 138 and the ninth evaporation pipe 139, and a tenth connection pipe 160 connecting the tenth evaporation pipe 140 and the eleventh evaporation pipe 141. In this case, as the first evaporation pipe 131, the first connection pipe 151, and the second evaporation pipe 132 are arranged in the first zone 110*b*, the first evaporation pipe 131 and the second evaporation pipe 132 cool the fluid moving through the first zone 110*b*, thereby improving the cooling efficiency of the fluid. In addition, the second evaporation pipe 132 forms the first offset (a1) with the first evaporation pipe 131 in the second direction ((2)) and forms the second offset (a2) with the first evaporation pipe 131 in the longitudinal direction, thereby preventing the fluid between the first evaporation pipe 131 and the second evaporation pipe 132 from being excessively cooled and preventing the first evaporation pipe 131 and the second evaporation pipe 132 from being blocked therebetween by ice. In addition, as the second evaporation pipe 132 forms the first offset (a1) with the first evaporation pipe 131 in the second direction (②) and forms the second offset (a2) with the first evaporation pipe 131 in the longitudinal direction, there is an advantage in that the first connection pipe 151 is not excessively bent, and the first evaporation pipe 131 and the second evaporation pipe 132 are smoothly connected. In addition, the second connection pipe 152 passes through the first opening 121*a* of the first partition wall 121. In this case, the third evaporation pipe 133, the third connection pipe 153, the fourth evaporation pipe 134, the fourth connection pipe 154, and the fifth evaporation pipe 135 are disposed in the second zone 110*c* to cool the fluid moving in the second zone 110*c*. In this case, as the size of the second zone 110*c* is larger than the size of the first zone 110*b*, the amount of the fluid accommodated by the second zone 110*c* is larger than the amount of the fluid accommodated by the first zone 110*b*. That is, while the fluid moving through the second zone 110*c* is moving downward through the second opening 152*a*, the fluid moving through the first zone 110*b* is smoothly moved to the second zone 110*c* through the first opening 151*a*, thereby preventing the water level of the accommodation space 119 from rapidly increasing. In addition, the fifth connection pipe 155 passes through the third opening 123*a*. In this case, the sixth evaporation pipe 136 is disposed in the third zone 110*d*. In this case, as the size of the third zone 110*d* is smaller than the size of the second zone 110*c*, the amount of the fluid accommodated by the third zone 110*c* is smaller than the amount of the fluid accommodated by the second zone 110*b*. That is, while the fluid moving through the third zone 110*c* is moving downward through the third opening 153*a*, the fluid moving through the second zone 110*c* is continuously moved to the third zone 110*c*, improving the cooling efficiency in which the fluid is cooled by the sixth evaporation pipe 136. In addition, the sixth connection pipe 156 passes through the third opening 123*a*. In this case, the seventh evaporation pipe 137, the seventh connection pipe 157, the eighth evaporation pipe 138, the eighth connection pipe 158, and the ninth evaporation pipe 139 are disposed in the fourth zone 110*e* to cool the fluid moving in the fourth zone 110*e*. In this case, as the size of the fifth zone 110*e* is equal to the size of the second zone 110*c*, the amount of the fluid moving through the fourth zone 110*e* is equal to the amount of the fluid moving through the second zone 110*d*, so the fluid of the second zone 110*c* passes through the third zone 110*d* and moves smoothly to the fourth zone 110*d*. In addition, the ninth connection pipe 159 passes through the fourth opening 124*a*. In this case, the tenth evaporation pipe 140 is disposed in the fifth zone 110*f*. In this case, as the size of the fifth zone 110*f* is smaller than the size of the fourth zone 110*e*, the amount of the fluid accommodated by the fifth zone 110*f* is smaller than the amount of the fluid accommodated by the fourth zone 110*e*. That is, while the fluid moving through the fifth zone 110*f* is moving downward through the fourth opening 124*a*, the fluid moving through the fourth zone 110*e* is continuously moved to the fifth zone 110*f*, improving the cooling efficiency in which the fluid is cooled by the tenth evaporation pipe 140. In addition, the tenth connection pipe 160 passes through the fifth opening 125*a*. In this case, the 11th evaporation pipe 141, the 11th connection pipe 161, and the 12th evaporation pipe 142 are disposed in the sixth zone 110*g* to cool the fluid moving in the sixth zone 110*g*. As such, according to an exemplary embodiment of the present invention, the fluid is cooled by heat exchange with the evaporator 130 in a direct water manner along the partition wall part 120 that divides the accommodation space 119 of the body part 110, thereby improving the performance of large-capacity cold water extraction.

In addition, according to an exemplary embodiment of the present invention, at least one evaporation pipe 131, 132, 133, 134, 135, 136, 137, 138, 139, 140, 141, 142 may be disposed in each of the zones except for the uppermost zone 110*a* and the lowermost zone 110*h* among the zones of the accommodation space 119. Since the uppermost zone 110*a* is adjacent to the upper surface 111 and the lowermost zone 110*h* is adjacent to the lower surface 112, the at least one evaporation pipe 131, 132, 133, 134, 135, 136, 137, 138, 139, 140, 141, 142 is not disposed in the uppermost zone 110*a* and the lowermost zone 110*h*, thereby preventing the chilliness of the evaporator 130 from being rapidly transmitted to the upper surface 111 and the lower surface 112. In addition, according to various embodiments of the present invention, the at least one evaporation pipe 131, 132, 133, 134, 135, 136, 137, 138, 139, 140, 141, 142 may not be disposed in the lowermost zone 110*h* while being disposed in the uppermost zone 110*a*. In addition, according to various embodiments of the present invention, the at least one evaporation pipe 131, 132, 133, 134, 135, 136, 137, 138, 139, 140, 141, 142 may be disposed in the lowermost zone 110*h* without being disposed in the uppermost zone 110*a*. In addition, according to various embodiments of the present invention, the at least one evaporation pipe 131, 132, 133, 134, 135, 136, 137, 138, 139, 140, 141, 142 may be disposed in the lowermost zone 110*h* while being disposed in the uppermost zone 110*a*.

In addition, as shown in FIG. 5, the plurality of first connection pipes 151, 153, 155, 157, 159, 161 are disposed in parallel and at equal intervals to each other on a first plane V1, which is a virtual plane of the accommodation space 119. In addition, the plurality of second connection pipes 152, 154, 156, 158, 160 are disposed in parallel and at equal intervals to each other on a second plane V2 parallel to the first plane V1 in the accommodation space 119. Accordingly, the plurality of first connection pipes 151, 153, 155, 157, 159, 161 and the plurality of second connection pipes 152, 154, 156, 158, 160 are distributed and arranged as much as possible in the accommodation space 119 of the body part 110 formed in a cube shape while connecting the m evaporation pipes, thereby as much as possible securing the area in which the evaporator 130 exchanges heat with the fluid. In addition, each of the n partition walls 121, 122, 123, 124, 125 is formed at a height through which any one of the plurality of first connection pipes 151, 153, 155, 157, 159, 161 and the plurality of second connection pipes 152, 154, 156, 158, 160 passes. Accordingly, the evaporator 130 has an advantage of being cooled in a direct water manner with the fluid while passing through the n partition walls 121, 122, 123, 124, 125. In addition, according to an exemplary embodiment of the present invention, the n partition walls 121, 122, 123, 124, 125 include a first partition wall part 122, 124, through which any one of the plurality of first connection pipes 151, 153, 155, 157, 159, 161 passes, and a second partition wall part 121, 123, 125 through which any one of the plurality of second connection pipes 152, 154, 156, 158, 160 passes. In addition, the first partition wall part 122, 124 and the second partition wall part 121, 123, 125 are alternately arranged in the transverse direction in the accommodation space. Accordingly, the openings 122*a*, 124*a* of the first partition wall part 122, 124 and the openings 121*a*, 123*a*, 125*a* of the second partition wall part 121, 123, 125 are disposed to be spaced apart from each other to prevent chilliness from being concentrated between the openings 121*a*, 122*a*, 123*a*, 124*a*, 125*a*, thereby preventing excessive ice formation around the openings 121*a*, 122*a*, 123*a*, 124*a*, 125*a*. In addition, according to an exemplary embodiment of the present invention, a third plane 151*a* (see FIG. 6) including any one of the plurality of first connection pipes 151, 153, 155, 157, 159, 161, and a plane 120*a* (see FIG. 2) including the partition wall part 120 are formed to have an angle greater than 0° and less than 90° from each other. For example, the angle may be approximately 30 degrees. In addition, a fourth plane 152*a* (see FIG. 6) including any one of the plurality of second connection pipes 152, 154, 156, 158, 160, and a plane 120*a* (see FIG. 2) including the partition wall part 120 are formed to have an angle greater than 0° and less than 90° from each other. For example, the angle may be approximately 30 degrees. As such, as shown in FIG. 6, a first angle α1 between any one 151 of the plurality of first connection pipes and any one 152 of the plurality of second connection pipes may be about 60 degrees. In addition, a second angle α2 between any one 152 of the plurality of second connection pipes and any one 153 of the plurality of first connection pipes is the same as the first angle α1 between any one 151 of the plurality of first connection pipes and any one 152 of the plurality of second connection pipes. For example, the second angle α2 may be approximately 60 degrees. As such, the plurality of first connection pipes 151, 153, 155, 157, 159, 161, and the plurality of second connection pipes 152, 154, 156, 158, 160 are formed to have an angle of approximately 60 degrees from each other, so that the plurality of first connection pipes 151, 153, 155, 157, 159, 161 and the plurality of second connection pipes 152, 154, 156, 158, 160 may stably connect the m evaporation pipes 131, 132, 133, 134, 135, 136, 137, 138, 139, 140, 141, 142 without being excessively bent.

In addition, according to an exemplary embodiment of the present invention, the cold water tank 100 is equipped with a temperature sensor 170 that senses the internal temperature of the body part 110. In this case, the temperature sensor 170 includes a first temperature sensor 171 disposed in the fourth zone 110*e* and a second temperature sensor 172 disposed in the fifth zone 110*f*. The first temperature sensor 171 is disposed adjacent to the upper side of the ninth connection pipe 159, and the second temperature sensor 172 is disposed adjacent to the lower side of the ninth connection pipe 159. There is a problem in that if ice is excessively generated on the outer circumferential surface of the ninth connection pipe 159, the fourth opening 124*a* may become clogged. To solve this problem, the first temperature sensor 171 and the second temperature sensor 172 measure the ambient temperature of the ninth connection pipe 159 to prevent excessive ice generation on the outer circumferential surface of the ninth connection pipe 159. In addition, according to an exemplary embodiment of the present invention, an air discharge part 115 penetrating the upper portion of the second side surface 114 of the body part 110 is provided in the cold water tank 100. The air discharge part 115 controls the discharge of air inside the body part 110 to the outside of the body part 110 according to the level of fluid accommodated in the body part 110. For example, the air discharge part 115 is closed so that the air inside the body part 110 is not discharged to the outside of the body part 110 to prevent the leakage of chilliness, and when the level of fluid accommodated in the body part 110 rises, the air discharge part 115 allows the air inside the body part 110 to be discharged to the outside of the body part 110, preventing the body part 110 from being damaged by the internal pressure of the body part 110. In addition, according to an exemplary embodiment of the present invention, a water level sensor 116 disposed on the upper side of the body part 110 is provided in the water cold water tank 100. The water level sensor 116 senses the water level of the fluid accommodated in the body part 110. In addition, the water level sensor 116 is provided to control the supply of the flow rate of the fluid supplied to the body part 110 according to the level of the fluid accommodated in the body part 110. In addition, the water level sensor 116 controls the air discharge part 115 according to the level of fluid accommodated in the body part 110. Accordingly, the water level sensor 116 prevents the body part 110 from being damaged by an increase in the internal pressure of the body part 110 by the fluid accommodated in the body part 110.

In addition, Table 1 is a table comparing the cold water efficiency of the conventional cold water tank and the cold water tank according to the embodiment of the present invention. The cold water tank of the conventional invention 1 generates cold water in a state of storing cold water, not a direct water type, and the cold water tank of the conventional invention 2 has a cylindrical structure to generate cold water in a direct water type. Here, the tank cold water efficiency is a value obtained by dividing the cold water extraction amount by the tank capacity.

TABLE 1

| Item | Conventional Invention 1 | Conventional Invention 2 | Present Invention |
|---|---|---|---|
| Size (W * D * H) | 187 * 187 * 187.5 mm | 260 * 448 * 1150 mm | 180 * 71 * 259 mm |
| Minimum Temperature | 3.3° C. | 4.3° C. | 3.2° C. |
| Tank Capacity | 6 L | 2.3 L | 2.93 L |
| Tank Cold Water Efficiency | 84% | 100% | 127% |

Referring to Table 1, the cold water efficiency of the cold water tank of the conventional invention 1 is 84%, the cold water efficiency of the cold water tank of the conventional invention 2 is 100%, and the cold water efficiency of the cold water tank according to the present invention is 127%. In this case, the cold water efficiency of the cold water tank according to the present invention shows that the amount of cold water extracted is greater than that of the fluid supplied because ice is formed on the outer circumferential surface of the evaporator. As such, it can be seen that the cold water tank according to the present invention has improved tank cold water efficiency compared to the conventional invention 1 and the conventional invention 2. In addition, it can be seen that since the cold water tank according to the present invention does not need to be limited to a cylindrical structure, the size of the cold water tank according to the present invention is smaller than the size of the cold water tank of the conventional invention 2, but rather the tank cold water efficiency is improved. In addition, since the minimum temperature of cold water in the cold water tank according to the present invention is 3.2° C., the minimum temperature of cold water in the cold water tank of conventional invention 1 is 3.3° C., and the minimum temperature of cold water in the cold water tank of conventional invention 2 is 4.3° C., the cold water tank according to the present invention can improve user satisfaction by extracting cold water at a lower temperature than conventional invention 1 and conventional invention 2. In addition, comparing the cold water tank according to the present invention with the cold water tank in which the evaporators are arranged in parallel in two rows, the refrigerant of the evaporator moves downward along the partition wall part and then moves upward again, thereby reducing the cooling efficiency by the refrigerant, so the cooling efficiency of the cold water tank according to the present invention is improved compared to the cold water tank in which the evaporators are arranged in parallel in two rows.

Although exemplary embodiments of the present invention have been described, the idea of the present invention is not limited to the embodiments set forth herein. Those of ordinary skill in the art who understand the idea of the present invention may easily propose other embodiments through supplement, change, removal, addition, etc. of elements within the same idea, but the embodiments will be also within the idea scope of the present invention.

What is claimed is:

1. A cold water tank, comprising:

a body part having an accommodation space for accommodating a fluid;

a partition wall part composed of n partition walls that laterally divide the accommodation space of the body part into n+1 zones, wherein n is an integer equal to or greater than 1;

an evaporator disposed in the accommodation space of the body part to cool a fluid moving through the n+1 zones, wherein the evaporator comprises:

m evaporation pipes, wherein m is an integer of 2 or more, that are arranged to face the partition walls, wherein at least some of the evaporation pipes are arranged in a first direction; and m−1 connection pipes connecting a kth evaporation pipe and a $[k+1]^{th}$ evaporation pipe so that the $[k+1]^{th}$ evaporation pipe forms a first offset with the $k^{th}$ evaporation pipe in a second direction perpendicular to the first direction and forms a second offset with the $k^{th}$ evaporation pipe in the longitudinal direction, and connecting the $[k+1]^{th}$ evaporation pipe and a $[k+2]^{th}$ evaporation pipe so that the $[k+2]^{th}$ evaporation pipe forms a first offset with the $[k+1]^{th}$ evaporation pipe in a third direction, which is the reverse direction of the second direction, and forms a second offset with the $[k+1]^{th}$ evaporation pipe in the longitudinal direction wherein k is an odd number equal to or greater than 1 and less than m−1, wherein the partition wall comprises an opening through which the connection pipe passes, wherein the m−1 connection pipes comprise:

a plurality of first connection pipes connecting the $k^{th}$ evaporation pipe and the $[k+1]^{th}$ evaporation pipe; and a plurality of second connection pipes connecting the $[k+1]^{th}$ evaporation pipe and the $[k+2]^{th}$ evaporation pipe, wherein the n partition walls comprise a first partition wall part through which any one of the plurality of first connection pipes passes and a second partition wall part through which any one of the plurality of second connection pipes passes, and the first partition wall part and the second partition wall part are alternately arranged in the transverse direction in the accommodation space.

2. The cold water tank of claim 1, wherein at least one evaporation pipe is disposed in each of the zones except for the uppermost zone and the lowermost zone among the zones of the accommodation space.

3. The cold water tank of claim 1, wherein the plurality of first connection pipes are disposed in parallel and at equal intervals to each other on a first plane of the accommodation space.

4. The cold water tank of claim 3, wherein the plurality of second connection pipes are disposed in parallel and at equal intervals to each other on a second plane parallel to the first plane in the accommodation space.

5. The cold water tank of claim 1, wherein each of the n partition walls is formed at a height through which any one of the plurality of first connection pipes and the plurality of second connection pipes passes.

6. The cold water tank of claim 1, wherein a third plane comprising any one of the plurality of first connection pipes and a plane comprising the partition wall part are formed to have an angle greater than 0° and less than 90° from each other.

7. The cold water tank of claim 1, wherein a fourth plane comprising any one of the plurality of second connection pipes and a plane comprising the partition wall part are formed to have an angle greater than 0° and less than 90° from each other.

8. The cold water tank of claim 1, wherein the opening is located at a regular interval from the inner surface of the body part.

9. The cold water tank of claim 1, further comprising:

an air discharge part formed on an upper side of the body part and controlling whether the air inside the body part is discharged to the outside of the body part according to a water level of a fluid accommodated in the body part.

10. The cold water tank of claim 9, further comprising:

a water level sensor disposed on an upper side of the body part and sensing the level of the fluid accommodated in the body part, wherein the water level sensor controls the air discharge part according to the level of the fluid accommodated in the body part.

11. The cold water tank of claim 1, further comprising:

a temperature sensor that senses the internal temperature of the body part.

* * * * *